United States Patent
Luo et al.

(10) Patent No.: US 11,015,769 B2
(45) Date of Patent: *May 25, 2021

(54) LIGHTING DEVICE, LUMINAIRE AND LIGHTING DEVICE ASSEMBLY METHOD

(71) Applicant: SIGNIFY HOLDING B.V., Eindhoven (NL)

(72) Inventors: Qun Luo, Eindhoven (NL); YueJun Sun, Eindhoven (NL); Xing Peng Yang, Eindhoven (NL); Min Chen, Eindhoven (NL); Dirk Gehrels, Eindhoven (NL); Ximei Lian, Eindhoven (NL); Mark Sipkes, Eindhoven (NL); Martinus Hermanus Wilhelmus Maria Van Delden, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 181 days.

This patent is subject to a terminal disclaimer.

(21) Appl. No.: 15/925,194

(22) Filed: Mar. 19, 2018

(65) Prior Publication Data
US 2018/0209593 A1    Jul. 26, 2018

Related U.S. Application Data

(62) Division of application No. 14/898,560, filed as application No. PCT/EP2014/062298 on Jun. 13, 2014, now Pat. No. 9,958,118.

(30) Foreign Application Priority Data

Aug. 13, 2013   (EP) ..................................... 13180181

(51) Int. Cl.
*F21K 9/90* (2016.01)
*F21K 9/27* (2016.01)
(Continued)

(52) U.S. Cl.
CPC .................. *F21K 9/90* (2013.01); *F21K 9/27* (2016.08); *F21K 9/66* (2016.08); *F21V 3/00* (2013.01);
(Continued)

(58) Field of Classification Search
CPC ..... F21K 9/66; F21K 9/27; F21K 9/69; F21K 9/272; F21K 9/275; F21V 3/0418;
(Continued)

(56) References Cited

U.S. PATENT DOCUMENTS

| 6,676,284 B1 | 1/2004 | Wynne Willson |
| 7,192,161 B1 | 3/2007 | Cleaver et al. |

(Continued)

FOREIGN PATENT DOCUMENTS

| CN | 202691638 U | 1/2013 |
| DE | 102009023052 A1 | 12/2010 |

(Continued)

OTHER PUBLICATIONS

Setomoto, LED, Aug. 24, 2011, English (Year: 2011).*

*Primary Examiner* — Bryon T Gyllstrom
*Assistant Examiner* — James M Endo
(74) *Attorney, Agent, or Firm* — Meenakshy Chakravorty

(57) ABSTRACT

A lighting device including a glass tube; a solid state lighting assembly in said glass tube, said assembly having an electrically insulating optical film having at least one arcuate portion lining a part of the inner surface of the glass tube, wherein the glass tube further has a further part defining a light exit portion; and a plurality of solid state lighting elements on a carrier, said carrier contacting said optical film; a thermally conductive member in between at least a part of the solid state lighting assembly and the glass tube for thermally coupling the solid state lighting elements to the glass tube; and a transparent or translucent electrically (Continued)

insulating cover contacting the electrically insulating optical film and covering the solid state lighting elements. A luminaire including such a lighting device and a lighting device assembly method are also disclosed.

10 Claims, 6 Drawing Sheets

(51) Int. Cl.
| | |
|---|---|
| F21K 9/66 | (2016.01) |
| F21V 25/02 | (2006.01) |
| F21V 3/00 | (2015.01) |
| F21V 3/04 | (2018.01) |
| F21V 3/06 | (2018.01) |
| F21V 29/70 | (2015.01) |
| F21S 4/20 | (2016.01) |
| F21V 13/04 | (2006.01) |
| F21V 21/34 | (2006.01) |
| F21Y 103/10 | (2016.01) |
| F21Y 115/10 | (2016.01) |
| F21V 7/00 | (2006.01) |
| F21V 7/18 | (2006.01) |
| F21Y 101/00 | (2016.01) |

(52) U.S. Cl.
CPC ............... *F21V 3/04* (2013.01); *F21V 3/061* (2018.02); *F21V 25/02* (2013.01); *F21V 29/70* (2015.01); *F21S 4/20* (2016.01); *F21V 3/062* (2018.02); *F21V 7/005* (2013.01); *F21V 7/18* (2013.01); *F21V 13/04* (2013.01); *F21V 21/34* (2013.01); *F21Y 2101/00* (2013.01); *F21Y 2103/10* (2016.08); *F21Y 2115/10* (2016.08)

(58) Field of Classification Search
CPC ... F21V 25/02; F21V 3/00; F21V 5/00; F21V 7/005; F21V 7/18; F21V 7/16; F21V 7/10; F21V 13/04; F21V 13/045; F21V 17/005; F21V 17/002; F21V 17/04; F21V 17/06; F21V 21/005; F21V 21/34; F21S 4/20; F21S 4/22

See application file for complete search history.

(56) References Cited

U.S. PATENT DOCUMENTS

| | | | |
|---|---|---|---|
| 2008/0220549 A1* | 9/2008 | Nall | H05K 3/284 |
| | | | 438/26 |
| 2009/0283794 A1* | 11/2009 | Mizuno | C08L 83/04 |
| | | | 257/100 |
| 2009/0296382 A1* | 12/2009 | Maier | F21V 15/01 |
| | | | 362/218 |
| 2010/0110678 A1 | 5/2010 | Shen et al. | |
| 2010/0220469 A1 | 9/2010 | Ivey et al. | |
| 2010/0254126 A1 | 10/2010 | Yang | |
| 2011/0044043 A1* | 2/2011 | Wong | F28D 15/0233 |
| | | | 362/249.02 |
| 2011/0303928 A1 | 2/2011 | Kawabata | |
| 2011/0103053 A1 | 5/2011 | Chen et al. | |
| 2011/0192586 A1 | 8/2011 | Fan | |
| 2012/0051039 A1 | 3/2012 | Chang | |
| 2012/0069556 A1 | 3/2012 | Bertram et al. | |
| 2012/0147589 A1* | 6/2012 | Farmer | F21V 7/0083 |
| | | | 362/84 |
| 2012/0170269 A1* | 7/2012 | Jin | F21V 7/06 |
| | | | 362/247 |
| 2012/0176768 A1 | 7/2012 | Wu et al. | |
| 2012/0201023 A1 | 8/2012 | Yoneda | |
| 2013/0094200 A1 | 4/2013 | Dellian et al. | |

FOREIGN PATENT DOCUMENTS

| | | | | |
|---|---|---|---|---|
| EP | 2469155 | A1 | 6/2012 | |
| EP | 2487410 | A1 | 8/2012 | |
| JP | 4755323 | B1 * | 8/2011 | ............ F21V 29/85 |
| JP | 4755323 | B1 | 8/2011 | |
| WO | 2011132120 | A1 | 10/2011 | |
| WO | 2012041794 | A1 | 4/2012 | |
| WO | 2013057660 | A2 | 4/2013 | |
| WO | 2013064969 | A1 | 5/2013 | |

* cited by examiner

LIGHTING DEVICE, LUMINAIRE AND LIGHTING DEVICE ASSEMBLY METHOD

CROSS-REFERENCE TO PRIOR APPLICATIONS

This application is a divisional application of U.S. application Ser. No. 14/898,560, filed on Dec. 15, 2015, which is a U.S. National Phase application under 35 U.S.C. § 371 of International Application No. PCT/EP2014/062298, filed on Jun. 13, 2014, which claims the benefit of International Application No. PCT/CN2013/077872, filed on Jun. 25, 2013, which claims the benefit of European Patent Application No. 13180181.3, filed on Aug. 13, 2013. These applications are hereby incorporated by reference herein.

FIELD OF THE INVENTION

The present invention relates to a lighting device comprising a glass tube; a solid state lighting assembly in said glass tube, said assembly comprising an optical film comprising at least one arcuate portion lining a part of the inner surface of the glass tube and a plurality of solid state lighting elements on a carrier contacting said optical film.

The present invention further relates to a luminaire including such a lighting device.

The present invention yet further relates to an assembly method of such a lighting device.

BACKGROUND OF THE INVENTION

With a continuously growing population, it is becoming increasingly difficult to meet the world's energy needs as well as to control carbon emissions to kerb greenhouse gas emissions that are considered responsible for global warming phenomena. These concerns have triggered a drive towards more efficient energy consumption in an attempt to reduce energy consumption.

One such area of concern is lighting applications, either in domestic or commercial settings. There is a clear trend towards the replacement of traditional incandescent light bulbs, which are notoriously energy inefficient, with more energy-efficient replacements. Indeed, in many jurisdictions the production and retailing of incandescent light bulbs has been outlawed, thus forcing consumers to buy energy-efficient alternatives, e.g. when replacing incandescent light bulbs.

A particular promising alternative is provided by solid state lighting (SSL) devices, which can produce a unit luminous output at a fraction of the energy cost of incandescent light bulbs. An example of such a SSL element is a light emitting diode.

WO 2011/132120 A1 discloses a lighting device and a method to manufacture such a lighting device. The inventive concept is based on manufacturing a lighting device on an at least partly flexible sheet assembly which is rolled into a tube, such that the light source of the lighting device is arranged within the tube. The flexible sheet assembly is arranged such that the tube provides a light mixing chamber and light exit surface for the lighting device.

However, a particular problem associated with such tubular lighting devices is that upon fracturing of the glass tube the exposed electrical components such as the SSL elements may still be live, which therefore poses the risk of serious injury or even death by electrical shock if the live components are touched by someone. Moreover, the assembly of such tubular lighting devices can be cumbersome, and the amount of time and effort required to insert the flexible sheet assembly into the tubular body may result in an undesirable increase in the manufacturing cost of the lighting device.

SUMMARY OF THE INVENTION

The present invention seeks to provide a more secure lighting device.

The present invention further seeks to provide a luminaire comprising such a lighting device.

The present invention yet further seeks to provide a method of assembling a tubular lighting device such as the more secure lighting device of the present invention.

According to an aspect, there is provided a lighting device comprising a glass tube; a solid state lighting assembly in said glass tube, said assembly comprising an electrically insulating optical film comprising at least one arcuate portion lining a part of the inner surface of the glass tube, wherein the glass tube further comprises a further part defining a light exit portion; and a plurality of solid state lighting elements on a carrier, said carrier contacting said optical film; a thermally conductive member in between at least a part of the solid state lighting assembly and the glass tube for thermally coupling the solid state lighting elements to the glass tube; and a transparent or translucent electrically insulating cover contacting the electrically insulating optical film and covering the solid state lighting elements.

Such a lighting device benefits from the fact that live components such as the SSL elements are covered by the transparent or translucent electrically insulating cover, such that upon breakage of the glass tube, it is not easily possible to contact live electrical components, such that the risk of serious injury or even death caused by such contact is significantly reduced or even avoided altogether.

In an embodiment, the transparent or translucent electrically insulating cover comprises a further electrically insulating film extending from a first section of the electrically insulating optical film to a second section of the electrically insulating optical film such that the solid state lighting elements are enveloped by the electrically insulating optical film and the further electrically insulating film. In this embodiment, the electrically insulating chamber housing the SSL elements is defined by the electrically insulating optical film and the further electrically insulating film. Such an arrangement may be manufactured in a cost-effective manner as the additional materials required for providing the further electrically insulating film are relatively cheap and can be adhered to the electrically insulating optical film in a straightforward manner.

The further electrically insulating film may comprise polyethylene terephthalate (PET) or any other suitable transparent or translucent electrically insulating optical film, such as polycarbonate (PC) or poly(methyl methacrylate) (PMMA).

Alternatively, the transparent or translucent electrically insulating cover forms part of an electrically insulating plastic sleeve comprising a central compartment; and at least one arcuate further portion extending from said central compartment, each arcuate further portion being mounted on an arcuate portion of the electrically insulating optical film, wherein the central compartment houses the carrier carrying the solid state lighting elements. In this embodiment, the electrically insulating compartment housing the carrier and SSL elements is formed as an integral compartment, which may improve the structural integrity of the electrically insulating compartment housing the SSL elements.

The central compartment may comprise a recess exposing part of said carrier, wherein the thermally conductive member contacts the carrier through said recess to improve the thermal coupling of the SSL elements to the glass tube.

The thermally conductive member may be a thermally conductive adhesive such as a thermal tape. This is a particular cost-effective embodiment of a thermally conductive member, which furthermore assists in securing the solid state lighting assembly in the glass tube.

The thermally conductive adhesive may be located in between the optical film and the glass tube in order to secure the optical film on the inner surface of the glass tube.

Alternatively, the optical film may be located over the carrier such that the solid state lighting elements extend through a plurality of recesses of said optical film, and wherein the thermally conductive adhesive is located in between the carrier and the glass tube. This gives improved thermal coupling between the carrier and the glass tube at the expense of a more complex solid state lighting assembly.

In a particularly attractive embodiment, the thermally conductive adhesive is selected from an aluminium adhesive tape and a copper adhesive tape. The inventors have found that the use of such adhesive tapes significantly improves the thermal coupling with the glass tube, thereby facilitating the use of more powerful and/or a larger number of SSL elements in the glass tube without compromising thermal performance characteristics of the lighting device.

In an embodiment, the electrically insulating optical film is a reflective film in order to increase the luminous output of the lighting device through its light exit window.

According to another aspect, there is provided a luminaire comprising the lighting device according to one or more of the aforementioned embodiments. Such a luminaire may for instance be a holder of the lighting device or an apparatus into which the lighting device is integrated.

According to yet another aspect, there is provided a method of assembling a lighting device comprising a tubular body and a solid state lighting assembly in said tubular body, said assembly comprising a flexible optical film and a plurality of solid state lighting elements on a carrier, said carrier contacting said optical film, the method comprising providing a feeding apparatus comprising a first wheel comprising a pair of first rims delimiting a first main body having a concave surface profile and a second wheel comprising a pair of second rims delimiting a second main body, wherein the first rims cooperate with the second main body, and wherein the first rims are separated from the second rims by a spacing, said apparatus further comprising an outlet including a feeding funnel for engaging with the tubular body; placing said tubular body on said feeding funnel; feeding an end portion of the solid state light assembly into the feeding apparatus such that a first part of the end portion including said carrier is located in between the first main body and the second main body and a pair of second parts of the end portion extending from either end of the first part are located in said spacing such that said second parts are each shaped into an arcuate portion for lining a part of the inner surface of the tubular body by a respective one of said first rims; and rotating said first and second wheels such that the solid state assembly is shaped and fed into the tubular body through the feeding funnel.

It has been found to the provision of such a feeding apparatus facilitates the insertion of the solid state lighting assembly into the glass tube in order to form a lighting device including such a solid state lighting assembly. More specifically, the use of such an apparatus that pre-shapes the solid state lighting assembly into a shapes suitable for insertion into the glass tube obviates the need to pre-shape the solid state lighting assembly in a separate (C-shaped) jig, which jig subsequently needs inserting into the glass tube to place the solid state lighting assembly in the glass tube, and subsequently needs removing from the glass tube, which is a cumbersome process requiring several process steps, and which consequently adds to the cost of the manufacturing process.

The feeding apparatus may further comprise a plurality of preshaping wheels upstream from said first and second wheels, the method further comprising the step of preshaping said end portion by said plurality of preshaping wheels. This may obviate the need to manually insert the end portion of the solid state lighting assembly into the feeding apparatus, thereby further improving the ease of assembling the lighting device.

In an embodiment, the flexible optical film is an electrically insulating optical film, and wherein the solid state lighting assembly further comprises a transparent or translucent electrically insulating cover contacting the electrically insulating optical film and covering the solid state lighting elements, the method further comprising adhering the transparent or translucent electrically insulating cover to the flexible optical film prior to feeding said end portion into the feeding apparatus.

In an alternative embodiment, the flexible optical film is an electrically insulating optical film, and wherein the solid state lighting assembly further comprises a transparent or translucent electrically insulating cover contacting the electrically insulating optical film and covering the solid state lighting elements, the method further comprising adhering the transparent or translucent electrically insulating cover to the flexible optical film during feeding said end portion into the feeding apparatus.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
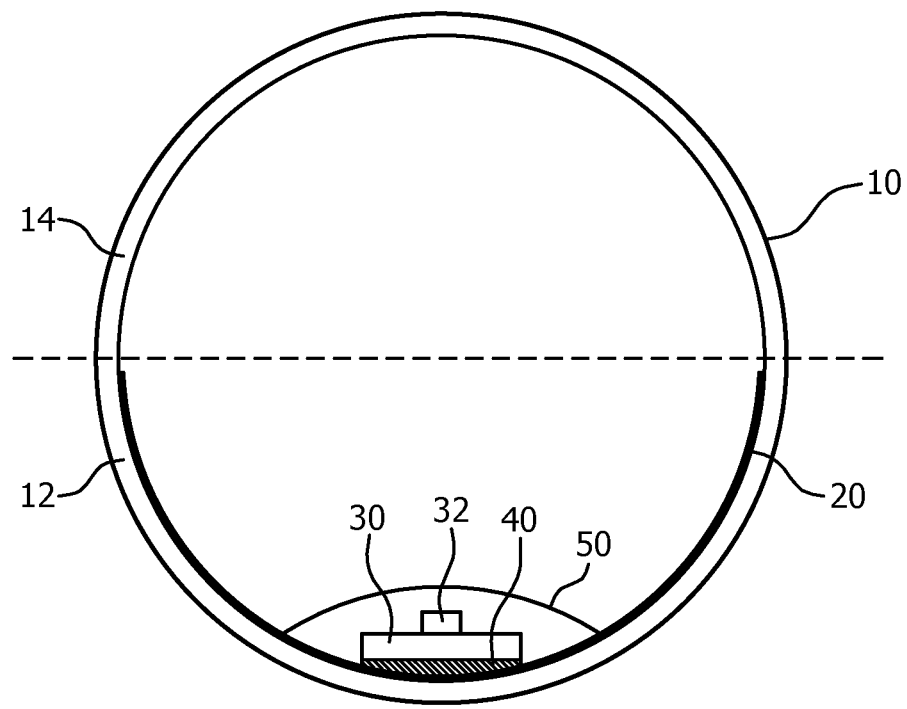
FIG. 1 schematically depicts a lighting device according to an embodiment of the present invention.

It should be understood that the Figures are merely schematic and are not drawn to scale. It should also be understood that the same reference numerals are used throughout the Figures to indicate the same or similar parts.

FIG. 1 schematically depicts an embodiment of a lighting device of the present invention. This embodiment for instance addresses the problem associated with traditional tubular LED-based lighting devices, which often include a separate aluminium heat sink to serve as heat dissipation and mechanical structure support. Such an aluminium heat sink has two disadvantages; it is heavy and costly, which can decrease the market competitiveness of the lighting device. At the same time, this embodiment provides improved protection against electrical shock in case of breakage of its glass tube.

The lighting device in FIG. 1 comprises a glass tube 10 into which a solid state lighting assembly is placed. The solid state lighting assembly comprises an electrically insulating optical film 20 such as a reflective film that lines an inner section 12 of the glass tube 10. The optical film 20 may be made of any suitable material, e.g. any suitable reflective material such as a reflective foil, e.g. an aluminium oxide foil, a reflective polymer film or a reflective stack of polymer layers or the like. Such films are known per se and will not be further explained for the sake of brevity.

In an embodiment, the optical film 20 covers in between 20 to 80% of the circumference of the inner surface of the glass tube, i.e. section 12, with the uncovered section 14 of the glass tube 10 acting as the light exit portion of the glass tube 10. In another embodiment, the optical film 20 covers in between 30 to 60% of the circumference of the inner surface of the glass tube. In some embodiments, the optical film 20 may be fixated onto the glass tube 10 to prevent it from moving inside the glass tube 20. This may be achieved in any suitable manner, e.g. by adding glue or tape to the opposing end portions of the optical film 20 to fix the optical film 20 to the glass tube 10.

A carrier 30 such as a strip-shaped printed circuit board (PCB) is mounted on the optical film 20, for instance by using a suitable adhesive such as glue or a double-sided tape. The carrier 30 carries a plurality of SSL elements 32, such as LEDs, which may be any suitable type of LEDs, e.g. organic or inorganic LEDs, and may have any suitable power. The carrier 30 may carrier any suitable number of SSL elements 32, which may be spaced apart by any suitable distance.

The optical film 20 may have an arcuate shape matching the arcuate shape of the inner wall of the glass tube 10. The optical film 20 may be flexible, e.g. elastic, such that it can be shaped into the desired arcuate shape. A non-limiting example of such an elastic optical film is a polymer film such as a PET film. In an embodiment, the optical film 20 has a thickness in the range of 0.1-0.3 mm. If the optical film 20 is too thin, the film will not have enough mechanical strength, causing it to break or come away from the glass tube 10, e.g. during transport of the lighting device. If the optical film 20 is too thick, it will be difficult to bend and insert into the glass tube 10. If the thickness of the optical film 20 is chosen in the above range, the optical film 20 may be easily bent to fit inside the glass tube 10, whilst being self-supporting as well as supporting the carrier 30. There is no need for glue or tape to adhere the optical film 20 to the inner surface of the glass tube 10 as the attractive forces or friction forces between the optical film 20 and the inner surface of the glass tube 10 are sufficient to keep the optical film 20 in place. Consequently, the lighting device of FIG. 1 can be manufactured at extremely low material cost and high efficiency for assembly.

In an embodiment, the optical film 20 carrying the solid state lighting elements is forced into the shape of the glass tube 10, as will be explained in more detail below. The mechanical supporting strength results from the bending forces acting upon the optical film 20. Consequently, once the glass tube 10 is broken, the optical film 20 will lose its bent shape. In other words, the mechanical strength of the optical film 20 and the SSL elements 32 is not sufficient to maintain the assembly in a lamp socket upon breakage of the glass tube 10. This is considered an important safety requirement in certain regulations, e.g. as defined in UL1933, 4$^{th}$ Ed, clause SA5.1.2 by the UL company, in the absence of additional insulation measures to ensure that the live parts are not accessible or the lighting device becomes non-operational upon breakage of the glass tube 10. Nevertheless, in order to further improve electrical insulation, a transparent or translucent electrically insulating cover is typically provided over the SSL elements 32. This provides additional protection in the event of (accidental) breakage of the glass tube 10. Unlike traditional tubular fluorescent or incandescent light bulbs, which tend to stop working once their tubular glass housing has been broken, SSL elements 32 in the glass tube 10 may remain operational upon the breakage of the glass tube 10. This may create electrical safety concerns. The electrically insulating cover addresses these safety concerns by ensuring that the live parts of the lighting device of FIG. 1 (or FIG. 2) remain substantially electrically insulated from the outside world upon breakage of the glass tube 10, such that the lighting device can be handled safely in the event of such breakage.

In FIG. 1, the electrically insulating cover takes the shape of a further electrically insulating film 50 extending between a first section and a second section of the optical film 20 such that the SSL elements 32 are enveloped by the optical film 20 and the further electrically insulating film 50. The further electrically insulating film 50 may be affixed to the optical film 20 in any suitable manner, e.g. using a suitable adhesive. The further electrically insulating film 50 preferably is a transparent or a translucent film, more preferably a transparent or a translucent polymer film such as a PET film, a polycarbonate film, a PMMA film or any other suitable electrically insulating polymer film 50. A PET film is particularly preferred. It will be understood that in this embodiment the optical film 20 should also be an electrically insulating film.

In an embodiment, the lighting device further comprises a thermally conductive member 40 such as a thermal tape or an aluminium strip in between a portion of the optical film supporting the carrier 30 and the glass tube 10, which improves the thermal coupling between the carrier 30 and the optical film 20 and/or glass tube 10. This allows for a separate heat sink to be omitted from the design. Thermal tapes are known per se, and it suffices to say that any suitable thermal tape or a double-sided tape may be used for this purpose.

Figure 2:
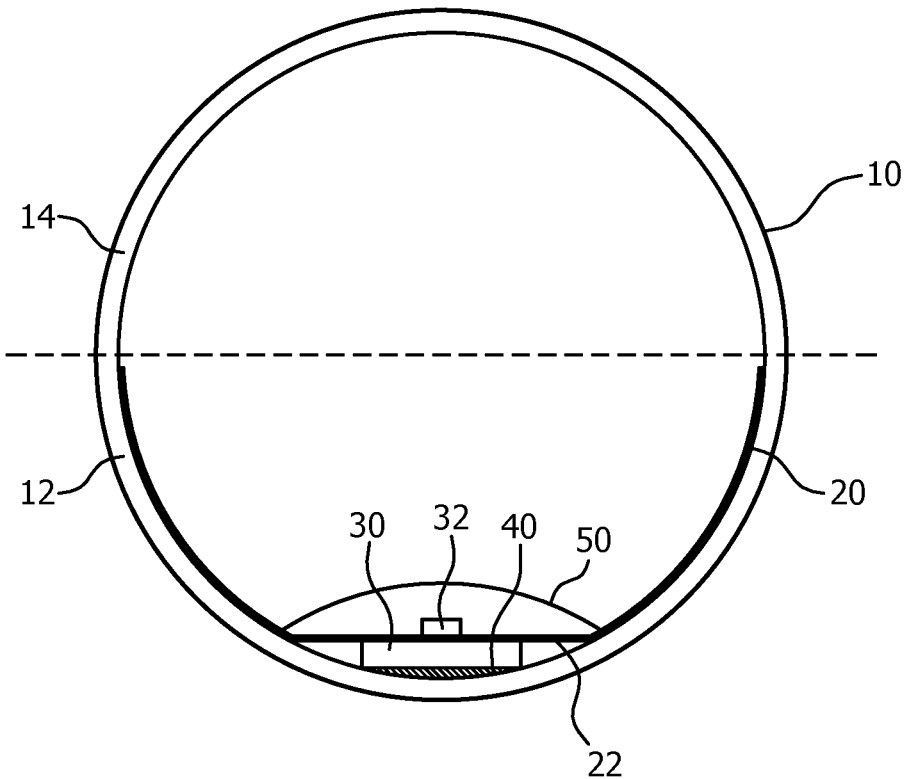
FIG. 2 schematically depicts a lighting device according to an alternative embodiment of the present invention.

In FIG. 1, the carrier 30 is mounted on the electrically insulating optical film 20 by way of non-limiting example. FIG. 2 schematically depicts an alternative embodiment in which the carrier 30 is mounted directly onto a surface portion of the glass tube 10. The same reference numerals have been used to indicate the same features as already described in the detailed description of FIG. 1 such that these features will not be described again for the sake of brevity. In FIG. 2, the optical film 20 has a planar section 22 that extends over the carrier 30. The planar section 22 interconnects two opposite arcuate sections of the optical film 20 that each line a section of the inner wall of the glass tube 10. The planar section 22 comprises a plurality of recesses or holes (not shown) for receiving the SSL elements 32 such that the SSL elements 32 extend from the carrier 30 through the holes of the optical tape 20. In this embodiment, the thermal tape 40 is located in between the carrier 30 and the glass tube 10. This embodiment provides an improved thermal coupling between the SSL elements 32 and the glass tube 10 compared to the embodiments schematically depicted in FIG. 1 at the expense of a modest increase in manufacturing complexity and cost.

Figure 3:
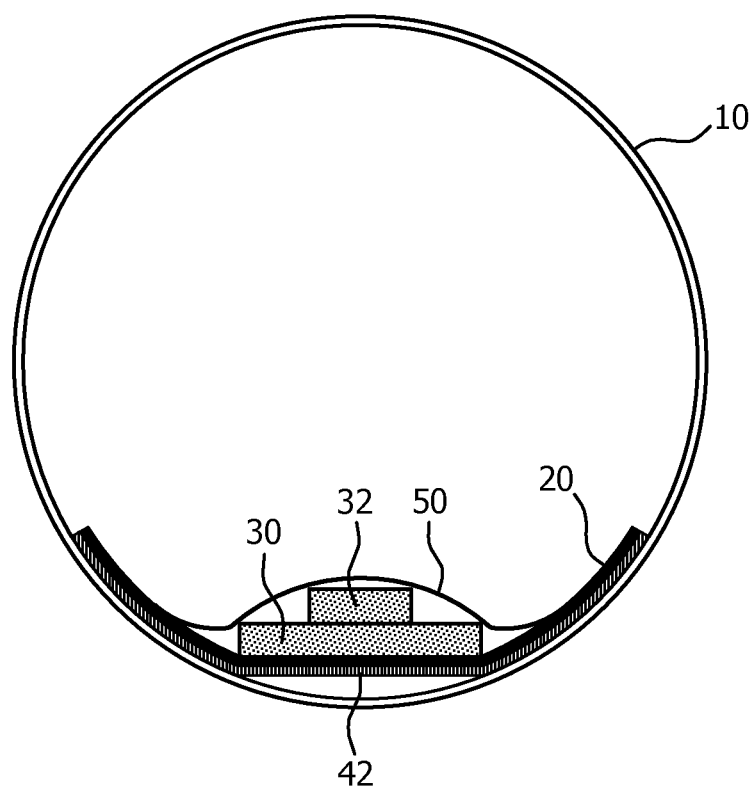
FIG. 3 schematically depicts a lighting device according to another embodiment of the present invention.

A further improvement in thermal performance of the lighting device is provided in the embodiment schematically depicted in FIG. 3. The same reference numerals have been used to indicate the same features as already described in the detailed description of FIG. 1 such that these features will not be described again for the sake of brevity. Compared to the embodiment depicted in FIG. 1, the lighting device of FIG. 3 comprises a thermally conductive member in the form of a metal adhesive tape 42 such as an aluminium adhesive tape or a copper adhesive tape. The metal adhesive tape 42 preferably extends over the full width of the electrically insulating optical film 20, i.e. the electrically insulating optical film 20 is entirely separated from the glass tube 10 by the metal adhesive tape 42 to maximize the thermal coupling between the carrier 30 carrying the SSL elements 32 and the glass tube 10. It should however be understood that it is equally feasible that the metal adhesive tape 42 extends over a portion of the width of the electrically insulating optical film 20, such as over at least 50%, at least 60%, at least 70% or at least 80% of the width of the electrically insulating optical film 20. In these embodiments, the metal adhesive tape 42 preferably is centered on the optical axis of the lighting device.

The metal adhesive tape 42 may have any suitable thickness. In some embodiments, the thickness of the metal adhesive tape 42 is 0.4 mm or less, 0.2 mm or less or even 0.1 mm or less. For instance, the thickness of the metal adhesive tape 42 may be selected in a range from 0.05-0.50 mm. If the metal adhesive tape 42 has a thickness of less than 0.05 mm, the thermal coupling may become insufficient. If the metal adhesive tape 42 as a thickness of more than 0.50 mm, the SSL element assembly may become difficult to bend in the desired shape.

Figure 4:
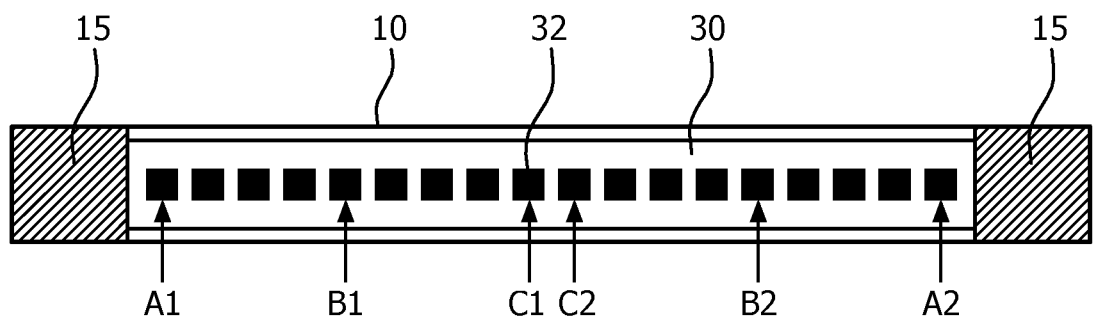
FIG. 4 schematically depicts a cross-section of a lighting device according to FIG. 3.

The provision of the metal adhesive tape 42 ensures that a lighting device can dissipate an increased amount of heat compared to the lighting device as shown in FIG. 1. This is demonstrated with the aid of FIG. 4, which depicts a cross-section of a lighting device according to an embodiment of the present invention including a plurality of SSL elements 32 on a carrier 30 inside the glass tube 10, which glass tube 10 is sealed by end caps 15 by way of non-limiting example. Other elements of the lighting device such as the electrically insulating optical film 20 and the thermally conductive member are not shown for reasons of clarity only. Six positions labelled A1, A2, B1, B2, C1 and C2 on the carrier 30 are highlighted in FIG. 4. In several thermal experiments, the temperature at these positions has been measured during operation of the lighting device comprising a plurality of LEDs generating a combined luminous output of 1200 lm.

Figure 5:
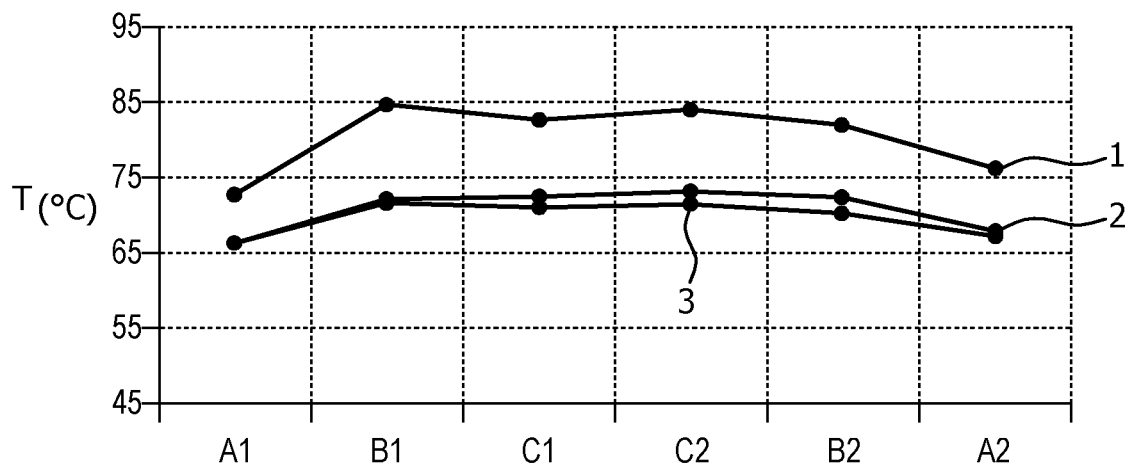
FIG. 5 depicts a graph displaying the temperatures at different points in the lighting device of FIG. 3 during operation.

FIG. 5 is a graph depicting the results of these thermal experiments. Curve 1 corresponds to the thermal behaviour of the lighting device of FIG. 1 using a thermal tape in between the carrier 30 and the optical film 20. Curve 2 corresponds to the thermal behaviour of the lighting device of FIG. 3 in which the metal adhesive tape 42 is a 0.1 mm thick aluminium adhesive film extending over the full width of the electrically insulating optical film 20. Curve 3 corresponds to the thermal behaviour of the lighting device of FIG. 3 in which the metal adhesive tape 42 is a 0.09 mm thick copper adhesive tape extending over the full width of the electrically insulating optical film 20.

As can be seen from the curves depicted in FIG. 5, the provision of the metal adhesive tape 42 six differently lowers the temperature of the carrier 30 at the measuring locations, i.e. by around 13° C., thereby clearly indicating the significant improvement in the thermal coupling between the carrier 20 and the glass tube 10 as provided by the metal adhesive tape 42. It is expected that for a higher density of SSL elements 32, this improvement is even more distinct. Consequently, the inclusion of the metal adhesive tape 42 facilitates the provisioning of a lighting device capable of producing a higher luminous output, e.g. 1600 lm or more, without exceeding the upper limit of the acceptable operating temperature of the SSL elements 32. As is well-known per se, the operation of SSL elements such as LEDs above such a temperature limit can alter the colour point at which the SSL elements produce light as well as significantly reduce their life span, such that exceeding such temperature limits should be avoided.

Figure 6:
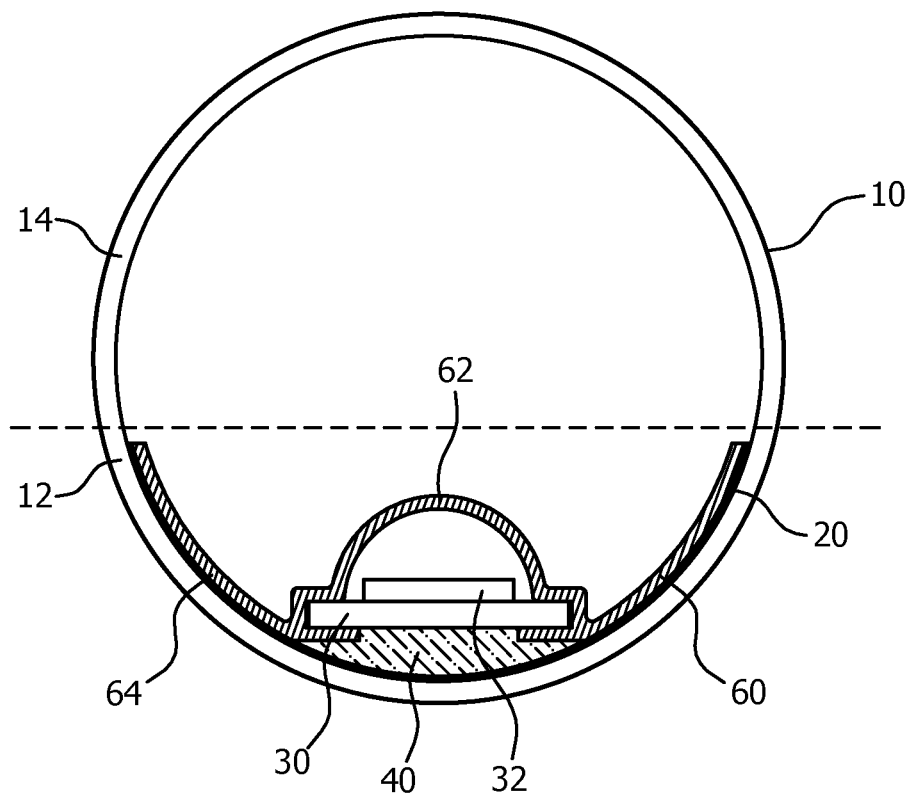
FIG. 6 schematically depicts a lighting device according to yet another embodiment of the present invention.

FIG. 6 shows an alternative embodiment in which the SSL elements 32 are substantially electrically insulated from the outside world in case of the breakage of the glass tube 10, such that the lighting device can be handled safely in the event of such breakage. The same reference numerals have been used to indicate the same features as already described in the detailed description of FIG. 1-3 such that these features will not be described again for the sake of brevity. In FIG. 6, the electrically insulating cover takes the shape of an electrically insulating plastic sleeve 60 comprising a central compartment 62 designed to fit the carrier 30 such that the SSL elements 32 and other live parts, e.g. the solder joints on the carrier 30, driver components and so on, are located inside the central compartment 62.

The plastic sleeve 60 further comprises at least one arcuate member 64 extending from the central compartment 62, which matches an arcuate portion of the electrically insulating optical film 20 and is in contact therewith. The arcuate member 64 may for instance be adhered to the optical film 20, e.g. using an adhesive such as glue or double-sided tape.

The plastic sleeve 60 may be made of any suitable electrically insulating polymer material that is transparent or translucent, e.g. PET, polycarbonate, PMMA and so on. The plastic sleeve 60 may be manufactured in any suitable manner, e.g. using molding techniques such as injection molding or by extrusion.

As before, the lighting device further comprises a thermally conductive member 40 that thermally couples the carrier 30 to the glass tube 10 via the optical film 20. To this end, the central compartment 62 of the plastic sleeve 60 may comprise a planar section facing the glass tube 10, which defines a void or cavity in between the plastic sleeve 60 and the glass tube 10, which void or cavity may be filled with the thermally conductive member 40, such that the heat generated by the SSL elements is more effectively dissipated, thereby improving the lifetime of the lighting device.

In an embodiment, the thermally conductive member 40 is an aluminium member, e.g. an aluminium strip. In an alternative embodiment, the thermally conductive member comprises a thermal tape. Alternatively of additionally, the lighting device of FIG. 6 may comprise a metal adhesive tape 42 as explained in more detail with the aid of FIG. 3.

Figure 7:
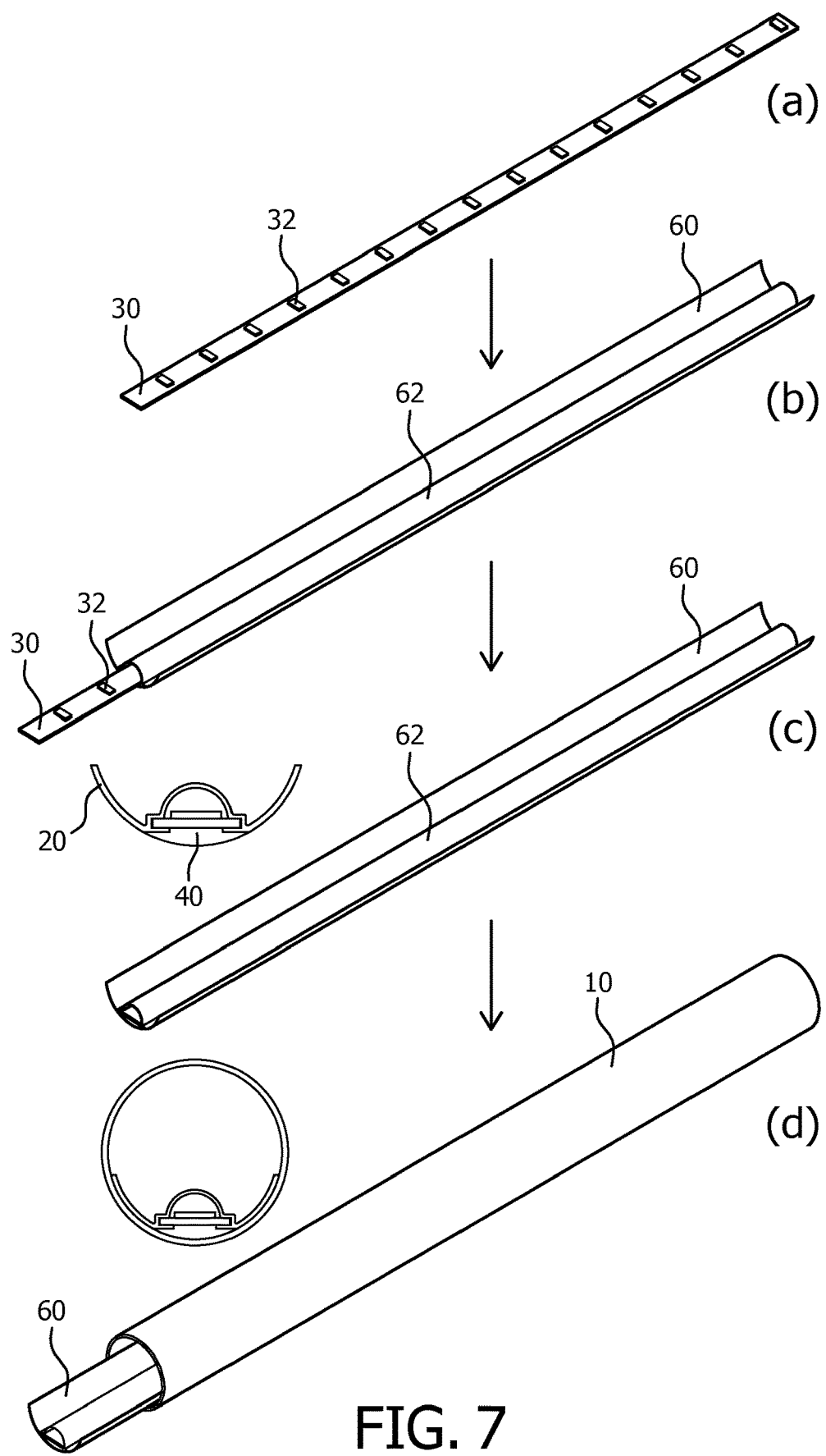
FIG. 7 schematically depicts a method of manufacturing a lighting device according to FIG. 6.

An example embodiment of a method of manufacturing the lighting device of FIG. 6 is shown in FIG. 7. The method starts in step (a) with the provision of a carrier 30, e.g. a PCB onto which a plurality of SSL elements 32, e.g. LEDs are mounted. The SSL elements 32 may be mounted onto the carrier 30 in any suitable manner known to the person skilled in the art. In step (b), the carrier 30 is inserted into the central compartment 62 of the plastic sleeve 60. The central compartment 62 preferably comprises a receiving portion for receiving the carrier 30 that matches the shape of the carrier 30, thus providing a snug fit between the carrier 30 and the plastic sleeve 60.

In step (c), the thermally conductive member 40 is attached to the bottom portion of the central compartment 62 that is to face the glass tube 10, e.g. using a suitable adhesive and the optical film is attached to the resultant structure, e.g. using a suitable adhesive such as glue or a double-sided tape. The thus formed SSL assembly is subsequently inserted into the glass tube 10 as shown in step (d), after which the glass tube 10 may be sealed in any suitable manner, e.g. using one or more end caps for connecting the SSL elements 32 to an external power supply.

The lighting device according to embodiments of the present invention may be advantageously included in a luminaire such as a holder of the lighting device, e.g. a ceiling light fitting, or an apparatus into which the lighting device is integrated, e.g. a cooker hood or the like. Other suitable type of luminaires, e.g. advertising luminaire comprising an array of tubular lighting devices and so on, will be apparent to the skilled person.

According to a further aspect, the present application discloses a method of inserting a SSL assembly including a flexible carrier into a tubular body such as a glass or polymer tube, e.g. a polymer tube made of an optical grade polymer material such as PC, PET or PMMA or the like. The SSL assembly typically comprises a plurality of SSL elements 32 mounted on a carrier 30, which carrier 30 may be mounted on the flexible carrier such as flexible optical film, e.g. an electrically insulating optical film 20, as for instance is shown in FIG. 1. Alternatively, the flexible carrier may cover the surface of the carrier 30 carrying the SSL elements 32 such that the carrier 30 may be in direct contact with the tubular body, as for instance is shown in FIG. 2.

A problem associated with flexible carriers, e.g. optical films such as the electrically insulating optical film 20 is that without application of a force on the flexible carrier, the carrier will typically assume a more or less planar shape, which obviously does not match the arcuate inner surface shape of a tubular body such as a glass tube 10. Therefore, in order to allow for the SSL assembly including the flexible carrier to be inserted into the tubular body, the flexible carrier needs to be forced into an arcuate shape prior to its insertion into the tubular body.

A known solution is to force the SSL assembly including the flexible carrier into a C-shaped rigid jig, which jig is subsequently inserted into the tubular body. The SSL assembly including the flexible carrier is manipulated such that it remains within the tubular body upon removal of the jig from the tubular body, wherein the flexible carrier retains its arcuate shape within the tubular body and is kept in place by the bending forces acting on the flexible carrier as previously explained. The jig typically has a length exceeding the length of the tubular body such a part of the jig sticks out of the tubular body, thus facilitating removal of the jig from the tubular body.

As will be appreciated, this process requires several process steps, such as the placement of the SSL assembly in the jig, the insertion of the jig in the tubular body and the selective removal of the jig from the tubular body, which is rather cumbersome and time-consuming, which translates into an increased manufacturing cost of a lighting device assembled in this manner. Moreover, this assembly process cannot be easily automated; the required use of manual labour further increases the manufacturing costs of the lighting device.

In order to obviate at least some of these problems, a feeding apparatus is provided that allows for automated insertion of a SSL assembly including a flexible carrier into a tubular body such as a glass tube, or at least significantly reduces the amount of manual intervention required for such assembling.

Figure 8:
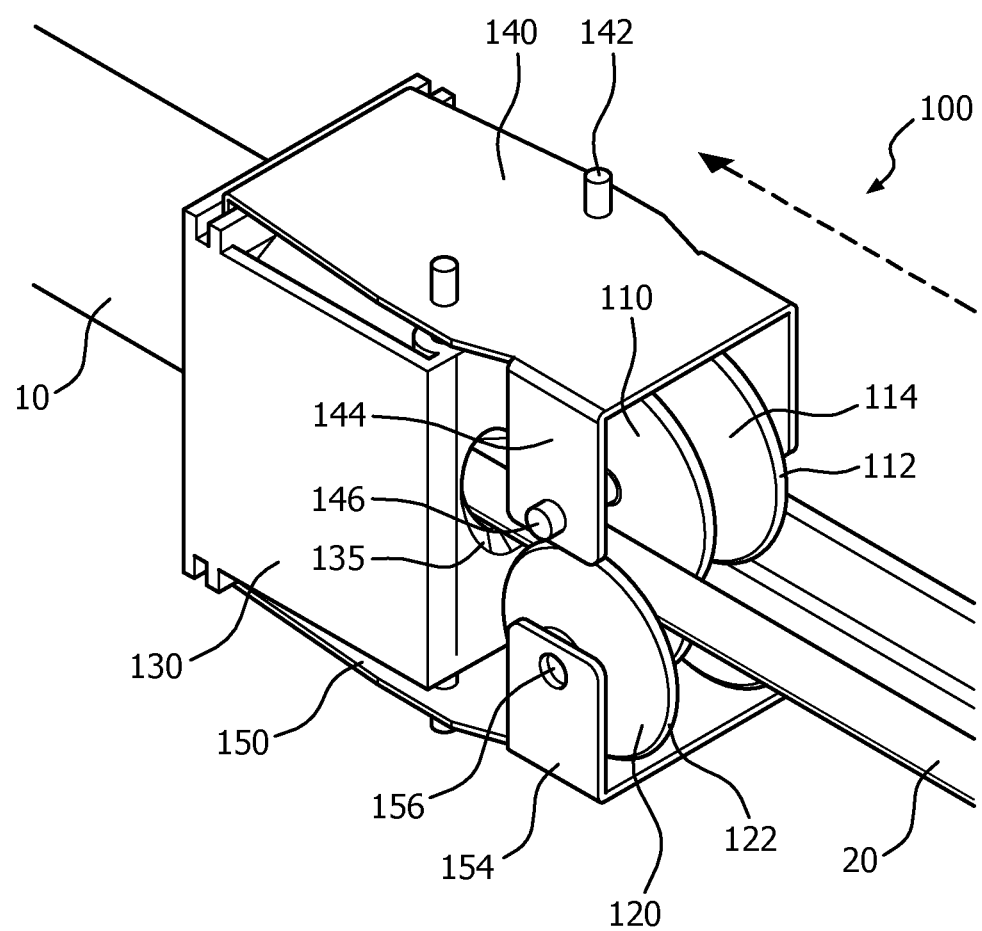
FIG. 8 schematically depicts a perspective view of a feeding apparatus for assembling a tubular lighting according to an embodiment.
Figure 9:
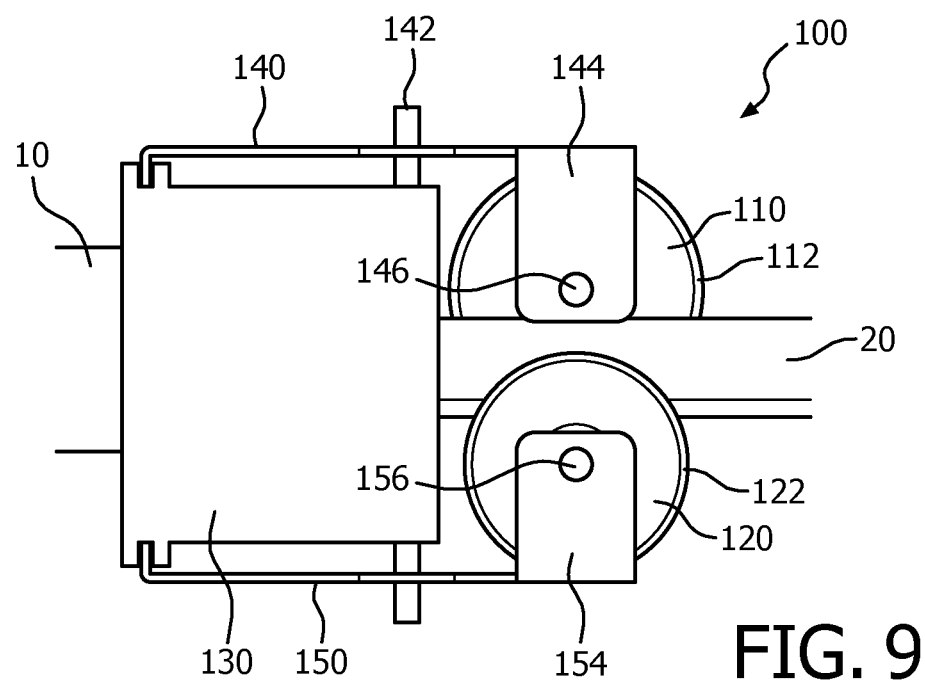
FIG. 9 schematically depicts a side view of a feeding apparatus for assembling a tubular lighting according to an embodiment.
Figure 10:
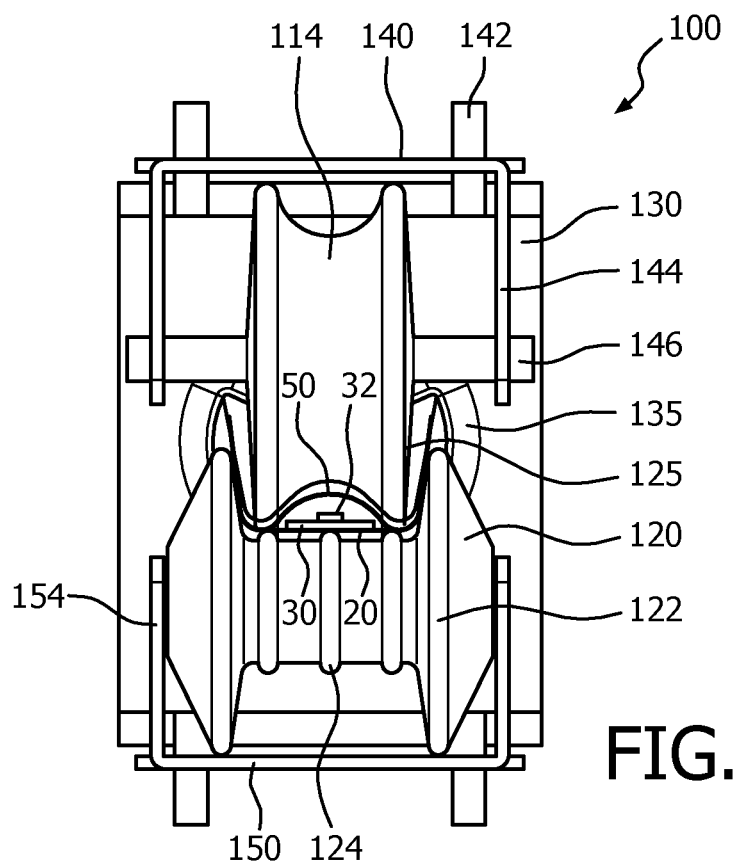
FIG. 10 schematically depicts a front view of a feeding apparatus for assembling a tubular lighting according to an embodiment.

FIG. 8 schematically depicts a perspective view of a feeding apparatus 100 according to an embodiment. FIG. 9 schematically depicts a side view of the feeding apparatus 100 and FIG. 10 schematically depicts a front view of the feeding apparatus 100. FIG. 8-10 will be described simultaneously below.

The feeding apparatus 100 comprises a first wheel 110 that cooperates with a second wheel 120 in order to shape a SSL assembly including a flexible carrier such as the electrically insulating optical film 20 into an arcuate shape suitable for fitting into a tubular body such as a glass tube 10. The first wheel 110 and second wheel 120 individually may be made from any suitable material, such as a relatively rigid polymer material, a metal or metal alloy such as cast iron or steel and so on.

The first wheel 110 may comprise a pair of first rims 112 in between which a first main body 114 of the first wheel 110 extends. The second wheel 120 may comprise a pair of second rims 122 in between which a second main body 124 of the second wheel 120 extends. The main body 114 may have a concave surface shape such that when the first wheel 110 cooperates with the second wheel 120, a cavity is formed in between the first main body 114 and the second main body 124, which cavity may house the carrier 30 and SSL elements 32 of the SSL assembly, such that the carrier 30 and SSL elements 32 are not damaged when the SSL assembly is fed through the feeding apparatus 100. This is particularly noticeable in FIG. 10.

In an embodiment, the first wheel 110 has a smaller width than the second wheel 120 such that the first rims 112 are located inside the second rims 122. In other words, the first rims 112 face the second main surface 124 of the second wheel 120 and cooperate with the second main surface 124 to grab the flexible carrier. The first rims 112 may be spaced apart from the second main surface 124 by a distance corresponding to the thickness of the flexible carrier, such that the flexible carrier is gripped tightly by the first wheel 110 and the second wheel 120 without damaging the flexible carrier. The first rims 112 may be fitted with a rubber ring (not shown) to further prevent such damage from occurring. In an embodiment, the rubber ring may cover both the first rims 112 and the first main surface 114, i.e. may be fitted over entire surface of the first wheel 110 facing the second wheel 120.

The first wheel 110 may be mounted in a spring-loaded fashion such that it is pressed against the second wheel 120 by the spring force. Consequently, the spacing between the first rims 112 and the second main body 124 is adjustable such that flexible carriers of different thicknesses can be shaped by the feeding apparatus 100. Alternatively, the first wheel 120 may be mounted in a spring-loaded fashion such that it is pressed against the first wheel 110 by the spring force. The spring pressure may be adjustable such that the amount of grip pressure on the flexible carrier may be adjusted. This may help to ensure that the SSL assembly cannot slip inside the feeding apparatus 100, thereby preventing accidental damage to the SSL assembly.

An area of the first rims 112 typically overlaps with an area of the second rims 122 such that a spacing 125 is formed in between the overlapping areas. As can be seen in particular in FIG. 10, as the width of the second main body 124 as delimited by the second rims 122 is typically smaller than the width of the flexible carrier fed into the feeding apparatus 100, the flexible carrier is forced into an arcuate shape by partially occupying the spacing 125 delimited by one of the first rims 112 and one of the second rims 122. Consequently, the cooperation of the first wheel 110 and the second wheel 120 forces the flexible carrier into an arcuate shape suitable for insertion into a tubular body such as the glass tube 10.

In an embodiment, the feeding apparatus 100 may further comprise a feeding funnel 135, which is typically dimensioned such that it can be inserted into a tubular body such as the glass tube 10. Alternatively, the feeding funnel 135 may snugly fit around the tubular body, i.e. the tubular body may be inserted into the feeding funnel 135. The feeding funnel 135 is placed downstream from the cooperating shaping wheels, such that the shaped SSL assembly is guided by the feeding funnel 135 into the tubular body without requiring manual intervention.

The second rims 122 of the second wheel 120 may also comprise a rubber ring for protecting the SSL assembly when being fed through the feeding apparatus. In an embodiment, this further rubber ring may cover both the second rims 122 and the second main surface 124, i.e. may be fitted over entire surface of the second wheel 110 facing the first wheel 120. The second main surface 124 may comprise one or more ribbed protrusions to further increase the grip of the second main surface on the SSL assembly. Alternatively, the one or more ribbed protrusions may form part of the further rubber ring.

In operation, an end portion of the SSL assembly may be manually fed into the feeding apparatus, i.e. manually shaped such that the SSL assembly can be inserted in between the first wheel 110 and the second wheel 120. Alternatively, the feeding apparatus may comprise a plurality of cooperating pre-shaping wheels (not shown) that may shape the SSL assembly such that it can be translated in between the first wheel 110 and the second wheel 120 of the feeding apparatus 100. The SSL assembly is typically fed through the feeding apparatus 100 in the direction indicated by the dashed arrow in FIG. 8.

In an embodiment, the first wheel 110 and/or the second wheel 120 may be manually driven. Alternatively, first wheel 110 and/or the second wheel 120 may be driven by one or more electromotors coupled to the first mounting axle 146 of the first wheel 110 and/or the second mounting axle 156 of the second wheel 120.

In FIG. 8-10, the feeding apparatus 100 comprises a single pair of feeding wheels, i.e. a single first wheel 110 and a single second wheel 120 by way of non-limiting example. It should be understood that the feeding apparatus 100 may comprise a plurality of such pairs of feeding wheels, such that a plurality of tubular bodies may be simultaneously provided with respective SSL assemblies that are simultaneously shaped by the respective pairs of feeding wheels as previously explained.

The first wheel 110 and the second wheel 120 may be mounted in the feeding apparatus 100 in any suitable manner. For instance and by way of non-limiting example, the feeding apparatus 100 shown in FIG. 8-10 comprises a body in which the first wheel 110 and the second wheel 120 are mounted. The body comprises side panels 130, a top panel 140 and a bottom panel 150. A pair of first flaps 144 extends downwardly from opposite sides of the top panel 140. The first axle 146 on which the first wheel 110 is mounted, extends between the opposite first flaps 144. A pair of second flaps 154 extends upwardly from opposite sides of the bottom panel 150. The second axle 156 on which the second wheel 120 is mounted, extends between the opposite second flaps 154.

The top panel 140 and bottom panel 150 typically extend beyond a front panel including the feeding funnel 135, such that the first flaps 144 including the first wheel 110 and the second flaps 154 including the second wheel 120 are located in front of, i.e. upstream to, the feeding funnel 135. The various panels of the feeding apparatus 100 may be assembled in any suitable manner, such as by mounting rods 142 that are affixed to the top panel 140 and the bottom panel 150 and that extend through a purposively shaped portion of the side panels 130, thereby immobilising the various panels relative to each other. As shown in FIG. 8-10, the front panel and the side panels 130 may form part of a single body portion onto which the top panel 140 and the bottom panel 150 are mounted, e.g. using mounting rods 142.

The various components of the feeding apparatus 100 may be made of any suitable material. A relatively stiff or rigid material is particularly preferred to increase the robustness of the feeding apparatus 100. In an embodiment, at least some of the components of the feeding apparatus 100, such as the various panels and/or the body thereof, are made of a metal or metal alloy such as cast iron or steel.

The feeding apparatus 100 may be used in an assembly method for assembling a lighting device comprising a tubular body such as a glass tube 10 in which a SSL assembly including an arcuate flexible carrier such as the electrically insulating optical film 20 is present. In particular, the feeding apparatus 100 may be used to force the flexible carrier into its arcuate shape in between the first wheel 110 and the second wheel 120 as previously explained and to feed the SSL assembly including the flexible carrier in its arcuate shape into the tubular body of the lighting device, e.g. using a feeding funnel 135. The SSL assembly typically comprises a flexible carrier such as the electrically insulating optical film 20, and a carrier 30 carrying a plurality of SSL elements 32. The carrier 30 may be placed in an electrically insulating holder such as the plastic sleeve 60 on the flexible carrier. The feeding apparatus 100 is typically dimensioned such that the plastic sleeve 60 including the carrier 30 fits in the cavity delimited by the first main body 114 of the first wheel 110 and the second main body 124 of the second wheel 120, such that damage to the SSL assembly is avoided when the SSL assembly is transported through the feeding apparatus 100.

Alternatively, the SSL assembly may further comprise a transparent or translucent electrically insulating cover such as a further electrically insulating film 50 extending from a first section of the electrically insulating optical film 20 to a second section of the electrically insulating optical film 20 such that the solid state lighting elements 32 are enveloped by the electrically insulating optical film 20 and the further electrically insulating film 50. The feeding apparatus 100 is typically dimensioned such that the SSL assembly including the further electrically insulating film 50 fits in the cavity delimited by the first main body 114 of the first wheel 110 and the second main body 124 of the second wheel 120, such that damage to the SSL assembly is avoided when the SSL assembly is transported through the feeding apparatus 100. The further electrically insulating film 50 may be adhered to the electrically insulating optical film 20 prior to feeding the SSL assembly into the feeding apparatus 100.

Alternatively, the feeding apparatus 100 may be used to adhere the further electrically insulating film 50 to the electrically insulating optical film 20. In this embodiment, a join between the further electrically insulating film 50 and the electrically insulating optical film 20 may be located in between a first rim 112 of the first wheel 110 and the second main body 124 of the second wheel 120, such that the pressure exerted between the first rim 110 and the second main body 124 may be used to seal the join between the further electrically insulating film 50 and the electrically insulating optical film 20. To this end, a pressure-sensitive adhesive may be present at the location of the join in between the further electrically insulating film 50 and the electrically insulating optical film 20. In summary, some embodiments of the feeding apparatus 100 may be defined by the following clauses:

1. A feeding apparatus (100) for feeding a SSL assembly including a flexible carrier into a tubular body, the feeding apparatus comprising a first wheel (110) that cooperates with a second wheel (120) in order to shape the flexible carrier into an arcuate shape suitable for fitting into said tubular body.

2. The feeding apparatus (100) of clause 1, wherein the first wheel (110) comprises a pair of first rims (112) delimiting a first main body (114) having a concave surface profile and the second wheel (120) comprises a pair of second rims (122) delimiting a second main body (124), wherein the first wheel cooperates with the second wheel such that the first rims cooperate with the second main body, and wherein the first rims are separated from the second rims by a spacing (125).

3. The feeding apparatus (100) of clause 2, wherein the first main body (114) and the second main body (124) cooperate to delimit a cavity for housing a carrier including a plurality of SSL elements of said SSL assembly.

4. The feeding apparatus (100) of any of clauses 1-3, said apparatus further comprising an outlet including a feeding funnel (135) for engaging with a tubular body (10) such that the feeding funnel fits inside the tubular body.

5. The feeding apparatus (100) of any of clauses 1-4, wherein at least the first rims (112) are fitted with a rubber ring.

6. The feeding apparatus (100) of clause 5, wherein the rubber ring covers the first rims (112) and the first main surface (114).

7. The feeding apparatus (100) of clause 5 or 6, wherein at least the second rims (122) are fitted with a further rubber ring.

8. The feeding apparatus (100) of clause 6 or 7, wherein the further rubber ring covers the second rims (122) and the second main surface (124).

9. The feeding apparatus (100) of any of clauses 1-8, wherein the first wheel (110) is mounted opposite the second wheel (120).

10. The feeding apparatus (100) of any of clauses 1-9, wherein at least one of the first wheel (110) and the second wheel (120) is driven by an electromotor.

11. The feeding apparatus (100) of any of clauses 1-10, comprising a plurality of first wheels (110) and a plurality of second wheels (120), wherein each first wheel cooperates with one of second wheels in order to shape a flexible carrier of a respective SSL assembly into an arcuate shape suitable for fitting into a respective tubular body.

The assembly method may be summarized by the following clauses:

12. A method of assembling a lighting device comprising a tubular body in which a SSL assembly including an arcuate flexible carrier is present on an inner surface portion of the tubular body, the method comprising providing a feeding apparatus (100) according to any of clauses 1-11, feeding an end portion of the flexible carrier into the feeding apparatus in between the first wheel (110) and the second wheel (120) to deform said flexible carrier into said arcuate shape, and transporting the SSL assembly into said tubular body by rotation of the first wheel (110) and the second wheel (120).

13. The method of clause 12, wherein said feeding step comprises feeding said end portion in between the first wheel and the second wheel such that a carrier of the SSL assembly carrying a plurality of SSL elements is located in between the first main body (114) and the second main body (124) and opposite portions of the flexible carrier are each located in between one of said first rims (112) and one of said second rims (122).

14. The method of clause 12 or 13, further comprising pre-shaping said end portion into said arcuate shape using a plurality of pre-shaping wheels prior to feeding said end portion in between the first wheel (110) and the second wheel (120).

15. The method of any of clause 12-14, wherein the flexible carrier comprises a main surface for facing an inner surface of the tubular body, the method further comprising providing an adhesive strip on said main surface, said adhesive member being covered by a protective member, and peeling the protective member from the adhesive member prior in between shaping the flexible carrier and transporting the SSL assembly into the tubular body.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A lighting device comprising:
   a glass tube;
   a solid state lighting assembly in said glass tube, said assembly comprising:
   an electrically insulating optical film comprising at least one arcuate portion lining a part of the inner surface of the glass tube, wherein the glass tube further comprises a further part defining a light exit portion; and
   a plurality of solid state lighting elements on a carrier, said carrier contacting said optical film;
   a thermally conductive member in between at least a part of the solid state lighting assembly and the glass tube for thermally coupling the solid state lighting elements to the glass tube; and a transparent or translucent electrically insulating cover contacting the electrically insulating optical film and covering the solid state lighting elements, wherein the transparent or translucent electrically insulating cover forms part of an electrically insulating plastic sleeve comprising:

a central compartment; and at least one arcuate further portion extending from said central compartment, each arcuate further portion being mounted on an arcuate portion of the electrically insulating optical film, wherein the central compartment houses the carrier carrying the solid state lighting elements.

2. The lighting device of claim 1, wherein the transparent or translucent electrically insulating cover comprises a further electrically insulating film extending from a first section of the electrically insulating optical film to a second section of the electrically insulating optical film such that the solid state lighting elements are enveloped by the electrically insulating optical film and the further electrically insulating film.

3. The lighting device of claim 2, wherein the further electrically insulating film comprises polyethylene terephthalate.

4. The lighting device of claim 1, wherein the central compartment comprises a recess exposing part of said carrier, wherein the thermally conductive member contacts the carrier through said recess.

5. The lighting device of claim 1, wherein the thermally conductive member is a thermally conductive adhesive such as a thermal tape.

6. The lighting device of claim 5, wherein the thermally conductive adhesive is located in between the optical film and the glass tube.

7. The lighting device of claim 5, wherein the optical film is located in over the carrier such that the solid state lighting elements extend through a plurality of recesses of said optical film, and wherein the thermally conductive adhesive is located in between the carrier and the glass tube.

8. The lighting device of claim 5, wherein the thermally conductive adhesive is selected from an aluminium adhesive tape and a copper adhesive tape.

9. The lighting device of claim 1, wherein the electrically insulating optical film is a reflective film.

10. A luminaire comprising the lighting device of claim 1.

* * * * *